US012715234B2

(12) United States Patent
Chen

(10) Patent No.: US 12,715,234 B2
(45) Date of Patent: Aug. 25, 2026

(54) 3D POP-UP CARDS WITH A BASE STRUCTURE

(71) Applicant: JAST Gifts Shenzhen Company Limited, Shenzhen City (CN)

(72) Inventor: Jen-Lin Chen, Cupertino, CA (US)

(73) Assignee: JAST Gifts Shenzhen Company Limited, Shenzhen City (CN)

( * ) Notice: Subject to any disclaimer, the term of this patent is extended or adjusted under 35 U.S.C. 154(b) by 94 days.

(21) Appl. No.: 18/235,268

(22) Filed: Aug. 17, 2023

(65) Prior Publication Data

US 2024/0059093 A1 Feb. 22, 2024

(30) Foreign Application Priority Data

Aug. 19, 2022 (DE) ......................... 202022104695.6

(51) Int. Cl.
*B42D 15/02* (2006.01)
*B42D 15/04* (2006.01)
*G09F 1/06* (2006.01)

(52) U.S. Cl.
CPC ......... *B42D 15/022* (2013.01); *B42D 15/042* (2013.01); *G09F 1/06* (2013.01)

(58) Field of Classification Search
CPC ............... G09F 1/065; G09F 1/06; G09F 1/08
See application file for complete search history.

(56) References Cited

U.S. PATENT DOCUMENTS 5,658,620 A * 8/1997 Ross .......................... G09F 1/08 40/539
9,475,333 B2 * 10/2016 Yeh ........................... B44C 5/06
9,842,516 B2 * 12/2017 Yeh ........................... B44C 5/00
12,162,302 B2 * 12/2024 Chen .................... B42D 15/022
2005/0132621 A1 * 6/2005 Bostick, II ................ G09F 1/06 40/124.08

(Continued)

FOREIGN PATENT DOCUMENTS

DE 202021103268 U1 * 9/2021
DE 202022104739 U1 * 10/2022 ........... B42D 15/045

*Primary Examiner* — Cassandra Davis
(74) *Attorney, Agent, or Firm* — Adams & Reese; John Henry Scott, III

(57) ABSTRACT

The invention refers to a 3D card comprising a foldable base card (1) having an inner side and an outer side, said base card (1) comprising two sections (2, 3) reversibly transferable along a fold (17) from a folded closed state to an unfolded opened state, and a foldable base structure (6, 6') reversibly transferable from a flat compressed state to a three-dimensional expanded state, and with a foldable figure (10) reversibly transferable from a flat compressed state to a three-dimensional expanded state, and wherein the foldable base structure (6, 6') is formed of a plurality of base elements (I, II, III, IV) and is fixed to the inner side of the foldable base card (1) via first fixing means (7, 7', 8, 8'), and wherein the foldable figure (10) is fixed to the foldable base structure (6, 6'), characterized in that the first fixing means (7, 7', 8, 8') are provided on two adjacent base elements (I, II, III, IV), and in each case one base element (I, II, III, IV) is fixed to the first section (2) via the first fixing means (7, 8) and one base element (I, II, III, IV) is fixed to the second section (3) via the first fixing means (7', 8').

17 Claims, 4 Drawing Sheets

(56) References Cited

U.S. PATENT DOCUMENTS

| | | | | |
|---|---|---|---|---|
| 2013/0191083 | A1* | 7/2013 | Bachrach | G06T 19/00 703/1 |
| 2016/0365010 | A1* | 12/2016 | Wise | G09F 1/10 |
| 2021/0005113 | A1* | 1/2021 | Wallen | B42D 15/042 |
| 2021/0158725 | A1* | 5/2021 | Adair | G09F 1/06 |
| 2024/0059093 | A1* | 2/2024 | Chen | B42D 15/022 |

* cited by examiner

3D POP-UP CARDS WITH A BASE STRUCTURE

TECHNICAL FIELD

The invention relates to 3D pop-up cards having a base structure, wherein the 3D pop-up card comprises a base card having a first section and a second section, wherein the sections are foldably connected to each other along a fold, and the base card is thus convertible from a folded closed state to an unfolded opened state, and wherein the base card has an inner side and an outer side, wherein a base structure is fixed to the inner side of the base card and foldable figures are fixable to this base structure and the figures unfold autonomously into a three-dimensional structure when the base card is transferred from a closed to an opened state.

BACKGROUND 3D pop-up cards, hereinafter also referred to simply as 3D cards, have been known for some time in a wide variety of embodiments and essentially comprise a generally simply folded card as a base, hereinafter referred to as a base card, and at least one figure arranged on this base card. The main function of such a 3D card is that the figure, which is initially compressed essentially in two dimensions, rises three-dimensionally from the map plane when the folded 3D card is opened.

Typically, corresponding 3D cards can be opened from a closed state by unfolding the two foldable sections of the base map by a total of 180° into a planar plane.

The underlying mechanism is based on the fact that the compressed figure is attached to the base card in such a way that opening the folded base card applies a tensile stress to the figure, which transfers the figure from the compressed or folded to the three-dimensional or expanded shape.

Thus, the construction of corresponding 3D cards requires, on the one hand, the formation of the figure that can be transferred from a compressed two-dimensional to an expanded three-dimensional state, and, on the other hand, a means of attaching this figure to the inner side of the base card.

Instead of fixing the figure directly to the base card, it has become established practice to first provide a foldable base on the base card to which the figure can be fixed. This allows a wider range of figures and arrangements.

3D cards are also subject to great price pressure and pressure to innovate due to their widespread use. Accordingly, ways are constantly being sought to improve the construction of 3D cards, to make them less expensive and to vary them for new arrangements.

Thus, the task of the invention is to provide an alternative construction for base structures for 3D cards, whereby the figure is fixed to the base card via the base structure ensuring the trouble-free unfolding of the figure when opening the 3D card.

This task is solved by an invention having the features of claim 1. Advantageous embodiments are in each case the subject of the dependent claims. It should be noted that the features listed individually in the claims can also be combined with one another in any desired and technologically useful manner and thus reveal further embodiments of the invention.

The following definitions are initially intended to serve in particular for understanding the precise positional relationships of the individual elements of the 3D card, since the arrangement and orientation in particular of the elements such as the base card, base structure and figure with respect to one another are of essential importance for understanding the invention.

The base card includes first and second sections foldably connected along a fold. First and second sections are provided foldable on top of each other along the fold, such that the inner sides of the sections and correspondingly of the base card rest on top of each other when closed.

First and/or second sections may be provided at least partially in single or multiple layers, with dual-layer embodiments having an inner layer and an outer layer being preferred. The layers of the two sections need not be congruent and may cover only portions of other layers, with substantially congruent layers being preferred.

The base card has an inner side and an outer side, wherein in the case of a base card having two or more layers, the outer side is formed by the respective outermost layer and the inner side is formed by the respective innermost layer.

If the base card lies in a flat plane in front of the viewer, the first section forms the left side of the base card and the second section the right side of the base card.

Assuming a rectangular basic shape of the base card and the two sections, respectively, to simplify the description of the position, the right and left edges of the base card and the right and left edges of the two sections, respectively, are aligned parallel to the fold. The upper and lower edges of the base card and the upper and lower edges of the two sections, respectively, are aligned perpendicular to the fold.

It is clear that the outer edges of the base card do not have to follow this strict geometry, this idealization is solely for further understanding of the positional designations.

The base structure is preferably provided in a rectangular and particular in a square shape and has four sides corresponding to a rectangle or cuboid, referred to as base elements. The individual base elements are foldably connected to each other.

The term "figure" is to be understood in a broad sense. Thus, a figure may comprise a single figure or a plurality of partial figures. Likewise, a figure can also be formed from a plurality of decorative elements which, when viewed as a whole, do not form a uniform figure, for example a geometric or natural figure. Accordingly, a figure is to be understood as those parts of the 3D card which are arranged on the base structure, without these parts or also figure elements necessarily having to form a uniform figure.

A figure comprises first and second substantially disc-shaped or flat figure elements, wherein the first figure elements are ideally arranged parallel to each other in the opened state of the base card and the second figure elements are ideally also arranged parallel to each other in the opened state of the base card and the first and second figure elements are ideally arranged perpendicular to each other in the opened state of the base card.

A figure may comprise only first figure elements, only second figure elements, or first and second figure elements.

Accordingly, a figure according to the invention may comprise, for example, a geometric shape, such as a sphere or a cuboid, or a natural shape, such as a plant, a human, or an animal. A figure according to the invention may also comprise, for example, a message, a greeting, or a landscape.

Combinations of different figures are possible.

Unless expressly indicated below, all position descriptions refer to the 180° unfolded, planar or opened state of the base map or the 3D card.

A 3D card according to the invention comprises a foldable base card having an inner side and an outer side, wherein the base card comprises two sections which are reversibly transferable along a fold from a folded closed state to an unfolded opened state.

The 3D card further comprises a foldable base reversibly transferable from a flat compressed state to a three-dimensional expanded state, and a foldable figure reversibly transferable from a flat compressed state to a three-dimensional expanded state, wherein the foldable base is formed of a plurality of base elements and is fixed to the inner side of the foldable base card via first fixing means, and wherein the foldable figure is fixed to the foldable base.

SUMMARY

According to the invention, the first fixing means are provided on two adjacent base elements, one base element being fixed to the first section via the first fixing means and one base element being fixed to the second section via the first fixing means, respectively.

The base structure is preferably provided in a rectangular shape, with square base structures being preferred. Polygonal pedestals are also possible.

The base structure is fixed to the inner side of the base card via first fixing means. The fixing means may be provided as part of the base structure, part of the base card or as independent elements and are accordingly fixable to the base structure and/or the base card. The first fixing means may extend along the length of a base element, but may also be shorter or longer than a base element. Preferably, the first fixing means are shorter than a base element.

The base structure is composed of a plurality of base elements, each base element forming one side of the base structure. The base elements may be provided in a single piece or in a plurality of pieces, and likewise the base structure may be provided in a single piece or in a plurality of pieces. Preferably, the base elements and base structure are provided in one piece.

The individual parts of the base structure or the base elements can be joined together, in particular by adhesive and/or plug-in connections.

If the base structure is provided in one piece, this means that the base elements are cohesive and only the terminal base elements have to be connected to each other to form the base structure, for example by gluing, plugging or other means.

If the base structure is provided in multiple parts, this means that the base elements must be connected at more than one point to form the base structure, for example four base elements must be glued or inserted into one another or connected in some other way to form a rectangular base structure.

The base structure is provided so as to be foldable at least in each case between the base elements, so that in the folded state in each case two base elements come to lie on top of one another.

According to the invention, the base structure is fixed to the first or left section of the base card via first fixing means with a first base element and to the second or right section of the base card via first fixing means with a second base element.

According to the invention, the first fixing means are provided on two adjacent base elements.

Preferably, the base card comprises notches in which the first fixing means can be fixed. The notches are aligned at an angle of ideally 90° to each other and 45° to the fold respectively. Accordingly, that corner of the base structure that is formed by the two base elements fixed to the base card lies on the fold.

Thus, the base structure is arranged rotated with respect to the base card. In the case of a square base, for example, this means that two opposite corners of the base are arranged on the fold of the base card and the two remaining corners of the base are arranged on the right and left sections of the card, respectively. Therefore, the base elements each form preferably an angle of ideally 45° with the fold.

In other words, the sides of the base are not parallel to the fold and not parallel to the outer edges of the base card, but are arranged at a 45° angle.

If the base is not square but rectangular, the above positional relationships are found accordingly, but only the corner of the rectangular base structure lies on the fold of the base card that is formed by the base elements that are fixed to the base card.

Alternatively, the first fixing means can also be fixed to the base card without incisions.

The base structure or the base elements have second fixing means for fixing a figure on the side facing away from the base card.

The figure is essentially composed of figure elements, each figure element preferably being fixed once to respective opposite base elements. In the preferred case of a rectangular or square base, the figure element thus fixed to two base elements then runs parallel to the two remaining base elements.

For fixing to the base elements and for fixing to possibly further figure elements, the figure elements comprise third fixing means. Preferably, the second and third fixing means are coordinated to allow easy assembly and, if necessary, disassembly of the respective elements.

Preferably, the 3D card further comprises light effects and acoustic effects that are triggered by opening the 3D card.

For this purpose, the 3D card comprises common electronic and electrical elements such as a power supply, a switch, an integrated circuit for controlling the electronic elements and a number of lighting elements and acoustic elements. Preferably, the electronic elements, with the exception of the light and acoustic elements, are arranged on a printed circuit board.

Preferred light elements are LEDs, whereby colors and number of LEDs can be arbitrary. Preferred acoustic elements are loudspeakers. The light and acoustic elements are provided to output certain visual and acoustic stimuli. A preferred power supply is batteries or rechargeable batteries.

The switch is used to activate the electronics when the 3D card is opened, in order to add visual and acoustic stimuli to the opening and/or the opened state of the 3D card with the unfolded figure. Accordingly, all types of switches are suitable, as are light or motion sensors that enable activation of the electronics by opening the 3D card. The skilled person is familiar with corresponding switches and sensors.

The electronic or electrical elements are preferably arranged between two layers of the base card. If necessary, cutouts for the light elements are provided in the base card.

The invention provides a simple and inexpensive way to manufacture 3D cards with a base construction.

The invention as well as the technical environment are shown below on the basis of the particularly preferred embodiment variant of the invention. However, the invention is not limited to the embodiment variant shown. In particular, the invention encompasses, to the extent that it is technically useful, any combination of the technical features listed in the claims or described in the description as relevant to the invention.

DETAILED DESCRIPTION

Figure 1:
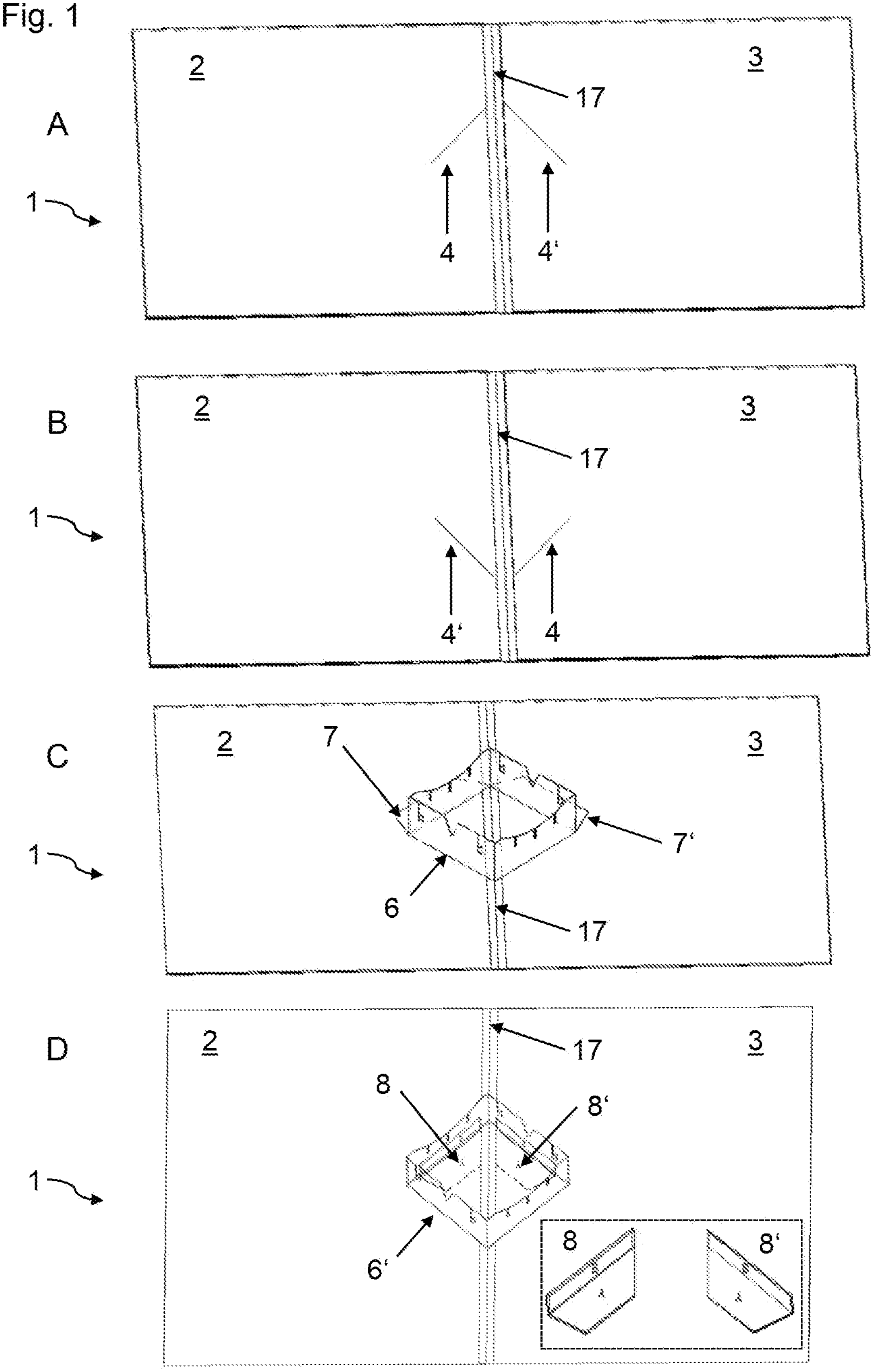
FIG. 1 A-D preferred embodiments of the base card with base.

FIG. 1A shows the base card 1 in the unfolded state with a first or left section 2 and a second or right section 3, wherein left and right sections 2, 3 are foldably connected to each other along a fold 17. The base card 1 is preferably provided in two layers. In the illustrated embodiment, notches 4, 4' are provided in the inner layer, wherein a first notch 4 is provided in the first section 2 and a second notch 4' is provided in the second section 3. The notches 4, 4' are provided for receiving the first fixing means (see FIG. 1C, D).

The incisions 4, 4' are ideally arranged perpendicular to each other and ideally at an angle of 45° to the fold 17. The opening formed by the incisions 4, 4' points downward.

FIG. 1B shows the base card 1 in the unfolded state with a first or left section 2 and a second or right section 3, wherein the left and right sections 2, 3 are foldably connected to one another along a fold 17. The base card 1 is preferably provided in two layers. In the illustrated embodiment, notches 4, 4' are provided in the inner layer, wherein one notch 4' is provided in the first section 2 and another notch 4 is provided in the second section 3. The incisions 4, 4' are provided for receiving the first fixing means (see FIG. 1C).

The incisions 4, 4' are ideally arranged perpendicular to each other and ideally at an angle of 45° to the fold 17. The opening formed by the incisions 4, 4' points upwards in this alternative embodiment.

FIG. 1C shows the base card 1 according to FIG. 1A with an assembled base 6. The first fixing means 7, 7' of the base structure 6 are fixed in the incisions 4, 4', the first fixing means 7 being fixed in the incision 4 and the first fixing means 7' being fixed in the incision 4'.

Two diagonally opposite corners of the base structure 6 ideally lie on the line of the fold 17.

FIG. 1D shows the base card 1 according to FIG. 1A with an alternative mounted base 6'. The alternative base structure 6' does not comprise its own fixing means. The alternative first fixing means 8, 8' are separate elements in L-shape with a first section 8A and 8'A respectively for fixing to the base card 1 and in particular to a notch 4, 4' and a second section 8B and 8'B respectively for fixing to the base structure 6, the section 8A being fixed in the notch 4 and section 8'A in the notch 4'.

Two diagonally opposite corners of the base structure 6' likewise ideally lie on the line of the fold 17.

FIGS. 2A-D show sectional patterns of various embodiments of square bases 6, 6'. The base structures 6, 6' each comprise four base elements I to IV of equal length, which each comprise second fixing means in the form of inserts 9 or snap-in elements 9' for receiving a figure on the side facing away from the base card, in FIGS. 2A-D corresponding to the upper edge.

Figure 2:
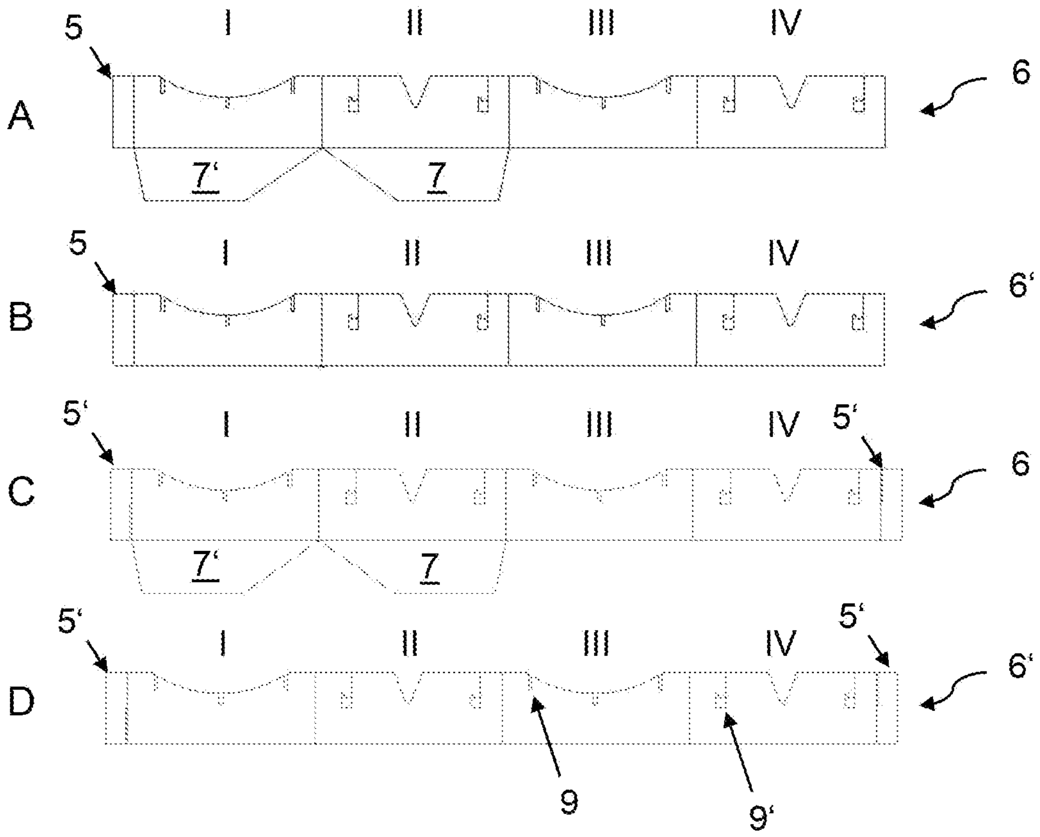
FIG. 2 A-D preferred embodiments of the base structure in the cutaway pattern.

According to FIGS. 2A and 2C, a first fixing means 7, 7' is provided on each of the base elements I and II.

According to FIGS. 2A and 2B, the terminal base elements I, IV are connectable to each other via a tab 5, the tab 5 preferably being fixed to the base element IV by an adhesive connection.

According to FIGS. 2C and 2D, the terminal base elements I, IV each comprise a plug-in connection 5' and can be connected to one another.

The base structures 6' according to FIGS. 2B and 2D can be fixed to the base card via the alternative first fixing means 8, 8' (see FIG. 1D).

Figure 3:
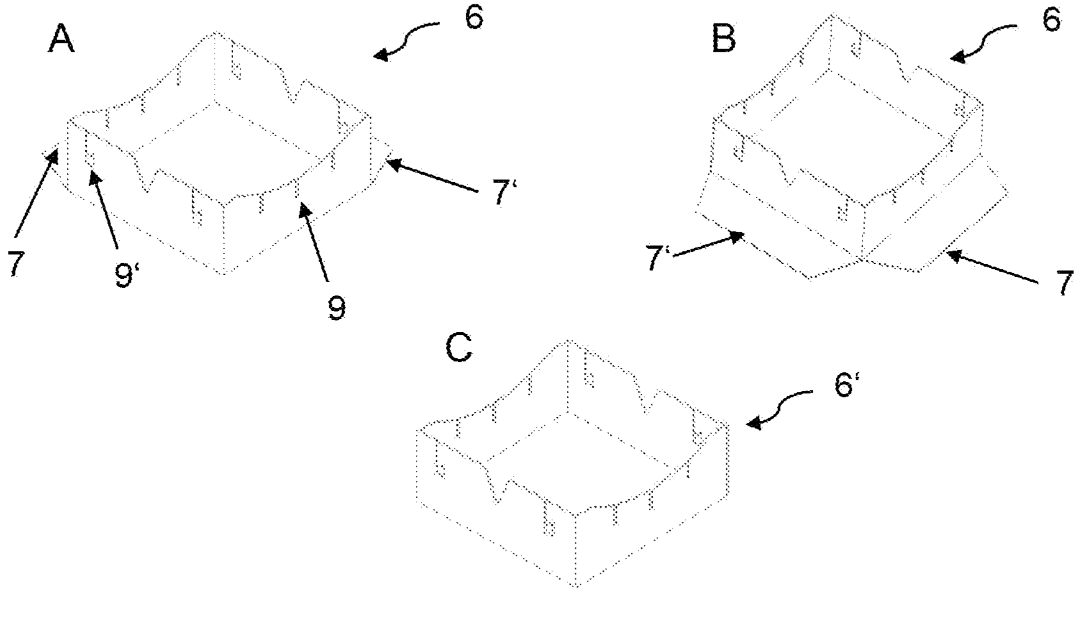
FIG. 3 A-C preferred embodiments of the base structure according to FIG. 2 in assembled state.

FIG. 3A-C shows the base structures 6, 6' according to FIGS. 2A-D in the assembled state, where FIGS. 3A and 3B correspond to the base structures 6 according to FIGS. 2A and 2C, and FIG. 3C corresponds to the base structures 6' according to FIGS. 2B and 2D.

Figure 4:
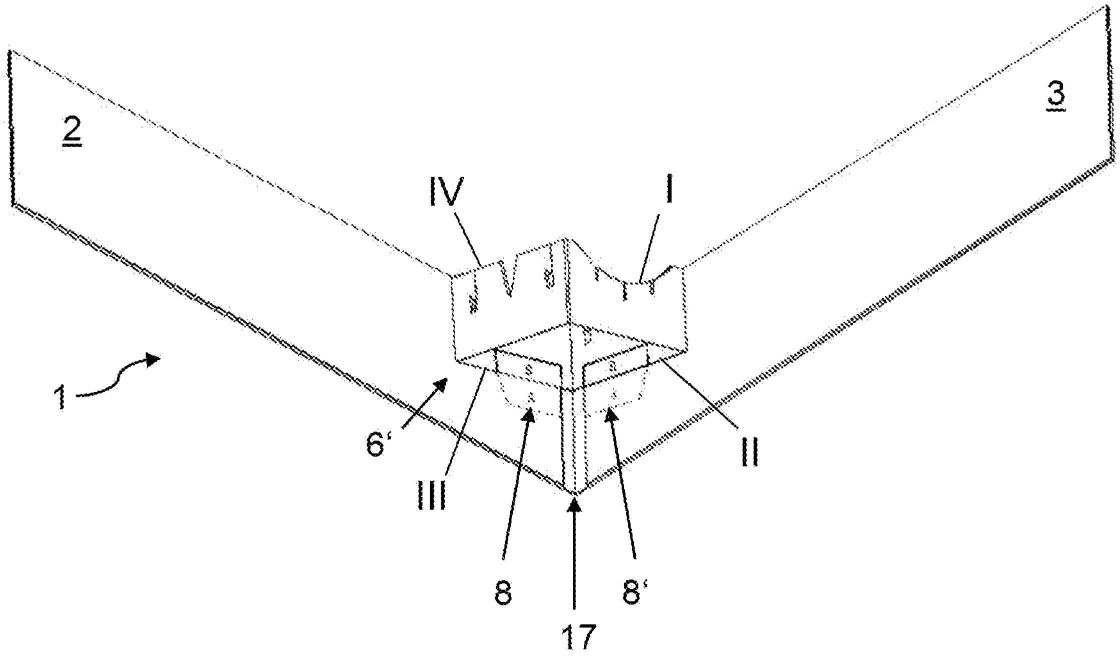
FIG. 4 preferred embodiments of the base card with base in partially collapsed state.

FIG. 4 shows the preferred base card 1 with base structures 6' according to FIG. 1D in a partially collapsed state. It can be seen that when the base card 1 is closed, two base elements, in this case base element IV and base element I as well as base element III and base element II, will lie on top of each other.

Figure 5:
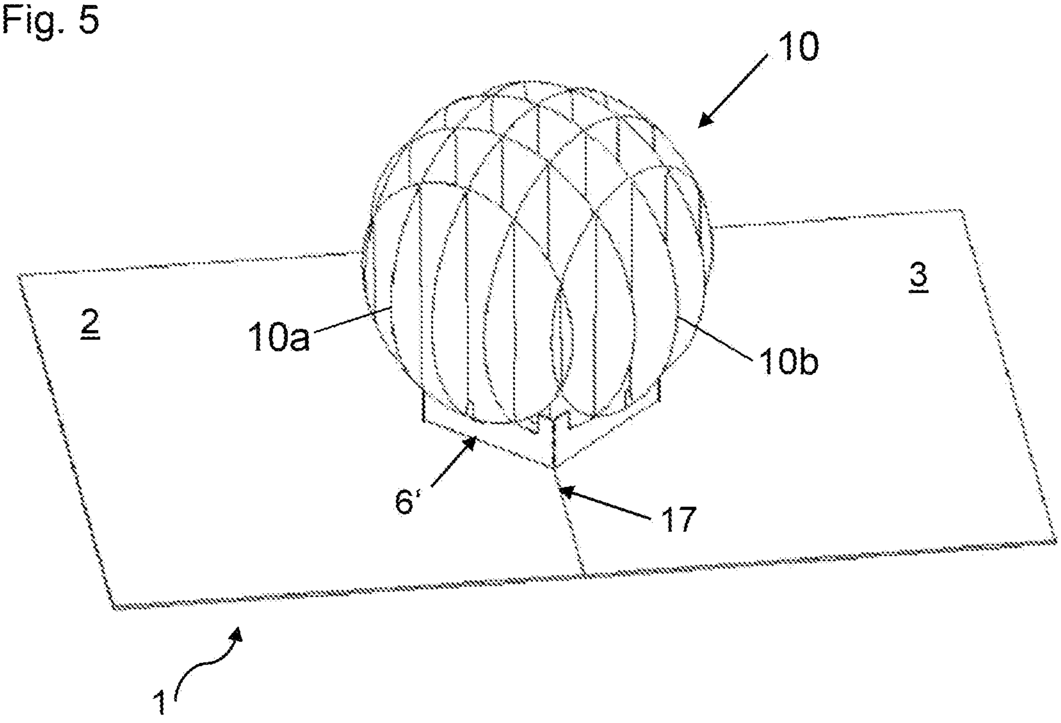
FIG. 5 preferred embodiments of the base card with base and figure.

FIG. 5 shows the preferred base card 1 with base structure 6' according to FIG. 1D or FIG. 4 with a figure 10 whose first figure elements 10A and second figure elements 10B are fixed to the base structure 6'.

Figure 6:
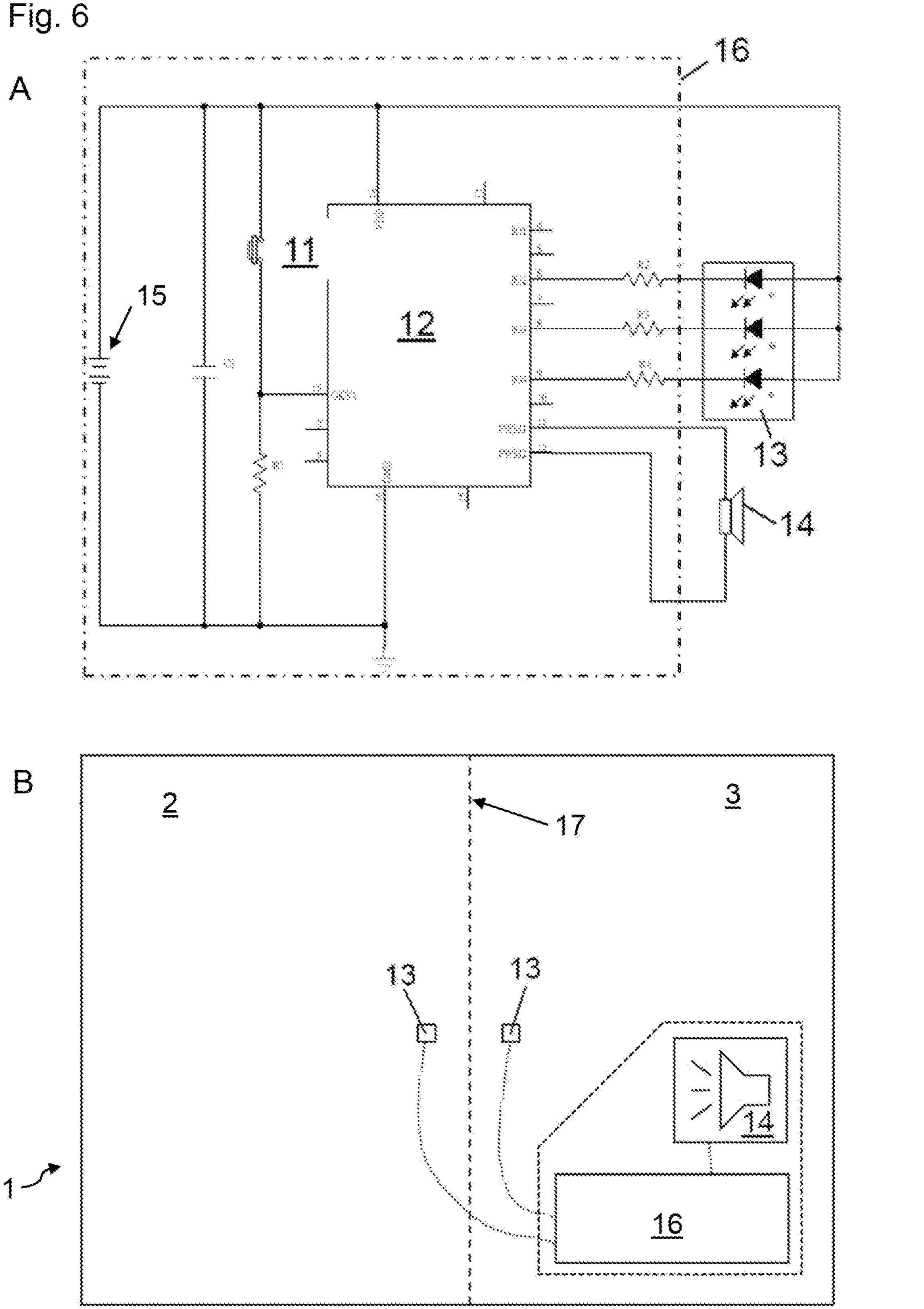
FIG. 6 A-B A: the electronic circuit; B: the unfolded base card with schematically shown arrangement of the electronics.

FIG. 6A shows a preferred circuit diagram for the electronics or electrics of the 3D card according to the invention with a power supply 15, a switch 11, an integrated circuit or also a microprocessor 12 as well as a number of light elements 13 and acoustic elements 14. Preferably, all of the elements mentioned with the exception of the light and acoustic elements 13, 14 are arranged on a printed circuit board 16.

Preferred light elements 13 are LEDs, whereby colors and number of LEDs can be arbitrary. Preferred acoustic elements 14 are loudspeakers. The light and acoustic elements 13, 14 are provided to output certain visual and acoustic stimuli. A preferred power supply 15 is batteries or rechargeable batteries.

The switch 11 is used to activate the electronics when the 3D card is opened, in order to add visual and acoustic stimuli to the opening and opened state of the 3D card with the unfolded figure. Accordingly, all types of switches which enable activation of the electronics by opening the card are suitable. Corresponding switches are known to the person skilled in the art.

FIG. 6B shows the foldable card 1 with recesses for the light elements 13 as well as the preferred arrangement of the electronics according to FIG. 6A. The light elements 13 are arranged in the recesses of the inner sides 2, 3. The printed circuit board 16 with the remaining electronics and the acoustic elements 14 are preferably arranged in a sandwich-like manner between the two layers of the card 1. Preferably, the printed circuit board 16 is located on the right side 3 of the base card 1, but the electronics can alternatively be arranged on the left side 2 or distributed on both sides 2,3. The same applies to the light and sound elements 13, 14, the arrangement of which is essentially based on the design of the 3D card and the desired effects and is subject to few technical constraints, provided that a folding of the base card 1 or the functioning of the electronic elements along the fold 17 is not impaired by the arrangement.

LIST OF REFERENCE SIGNS

- 1 base card
- 2 first or left section
- 3 second or right section
- 4, 4' notches
- 5, 5' connecting means (5: lug; 5': plug-in connection)
- 6, 6' base structure (I, II, III, IV: base elements)
- 7, 7' first fixing means
- 8, 8' alternative first fixing means (A: first section; B: second section)
- 9, 9' second fixing means (9: inserts; 9': snap-in elements)
- 10 figure (10*a*: first figure elements; 10*b*: second figure elements)
- 11 switch
- 12 circuit/microprocessor
- 13 light element (LED)
- 14 acoustic element (loudspeaker)
- 15 power supply
- 16 printed circuit board (PCB)
- 17 fold

The invention claimed is:

1. A three-dimensional (3D) card comprising a foldable base card (1) having an inner side and an outer side, said base card (1) comprising two sections (2, 3) reversibly transferable along a fold (17) from a folded closed state to an unfolded opened state, and a foldable base structure (6, 6') reversibly transferable from a flat compressed state to a three-dimensional expanded state, and with a foldable figure (10) reversibly transferable from a flat compressed state to a three-dimensional expanded state, and wherein the foldable base structure (6, 6') is formed of a plurality of base elements (I, II, III, IV) and is fixed to the inner side of the foldable base card (1) via fixing means, and wherein the foldable figure (10) is fixed to the foldable base structure (6, 6'), characterized in that the fixing means for fixing the base elements (I, II, III, IV) are first fixing means (7, 7', 8, 8'), and the first fixing means (7, 7', 8, 8') are provided on exactly two adjacent base elements (I, II, III, IV) of the plurality of base elements (I, II, III, IV), with a first of the adjacent base elements (I, II, III, IV) being fixed to the first section (2) via the first fixing means (7, 8) without crossing the fold (17) and a second of the adjacent base elements (I, II, III, IV) being fixed to the second section (3) via the first fixing means (7', 8'); wherein the first of the adjacent base elements (I, II, III, IV) is coupled between the second of the adjacent base elements (I, II, III, IV) and the fixing means (7, 8) that is fixed to the first section (2).

2. The 3D card according to claim 1, wherein at least those base elements (I, II, III, IV) that are fixed to the base card (1) each form an angle of 45° with the fold when the base card (1) is unfolded.

3. The 3D card according to claim 1, wherein the foldable figure (10) comprises first and second figure elements (10*a*, 10*b*).

4. The 3D card according to claim 3, wherein the first figure elements (10*a*) are arranged parallel to each other.

5. The 3D card according to claim 3, wherein the second figure elements (10*b*) are arranged parallel to each other.

6. The 3D card according to claim 1, wherein at least one section (2, 3) of the base card (1) is partially provided in two layers with an inner and an outer layer.

7. The 3D card according to claim 6, further comprising electrical and electronic components, light and acoustic elements (13, 14), a switch (11) for activating the light and acoustic elements (13, 14), a circuit or microprocessor (12) for controlling the electrical and electronic components, and a power supply (15).

8. The 3D card according to claim 7, wherein at least part of the electrical and electronic components comprising the light and acoustic elements (13, 14), the switch (11) for activating the light and acoustic elements (13, 14), the circuit or microprocessor (12) for controlling the electrical components and the power supply (15) is provided between two layers of the base card (1).

9. The 3D card according to claim 1, wherein the first of the adjacent base elements (I, II, III, IV) is coupled to the second of the adjacent base elements (I, II, III, IV) at the fold (17).

10. The 3D card according to claim 1, wherein the second of the adjacent base elements (I, II, III, IV) is fixed to the second section (3) without crossing the fold (17).

11. A three-dimensional (3D) card comprising:

a base card that includes a first section, a second section, and a fold positioned between the first and second sections, the first section having a first notch, the second section having a second notch, the base card to transition between an opened state and a closed state using the fold;

a base structure that includes first and second base elements, the first base element affixed to the first section via the first notch and the second base element affixed to the second section via the second notch to couple the base structure to the base card such that the first and second base elements are contiguous at the fold; and a fixing means separate from the base card and the base structure, the fixing means coupled between the second base element and the second section to affix the second base element to the second section.

12. The 3D card of claim 11, wherein the first base element comprises a first fixing means, the first notch to receive the first fixing means to affix the first base element to the first section.

13. The 3D card of claim 11, wherein the base structure is provided as a single piece that is formed by a plurality of base elements that includes the first and second base elements as adjacent base elements.

14. A three-dimensional (3D) card comprising:

a base card that includes a first section, a second section, and a fold positioned between the first and second sections, the base card to transition between an opened state and a closed state using the fold; and a base structure provided as a single piece that is formed by a plurality of base elements that includes first and second base elements as adjacent base elements, the first base element affixed to the first section and the second base element affixed to the second section to couple the base structure to the base card such that the fold intervenes between the first base element and the second section, wherein the plurality of base elements further includes a third base element with a tab coupled to the first base element to form the base structure, the first and third base elements arranged on opposing ends of the plurality of base elements.

15. The 3D card of claim 14, wherein the first base element comprises a first fixing means to affix the first base element to the first section.

16. The 3D card of claim 15, wherein the first base element further comprises a second fixing means arranged on a side of the first base element that opposes the first base element, the second fixing means to couple a figure to the base card via the base structure.

17. The 3D card of claim 14, wherein the third base element is coupled to the first section via the first base element without the third base element crossing the fold.

* * * * *